(12) United States Patent
Vasudevan

(10) Patent No.: US 11,922,239 B1
(45) Date of Patent: Mar. 5, 2024

(54) SYSTEM AND METHOD FOR ABSTRACTION OF APPLICATION PROGRAMMING INTERFACE CREATION WITHOUT CODE

(71) Applicant: EKAHAA SOLUTIONS INDIA PVT LTD, Hyderabad (IN)

(72) Inventor: Vikram Vasudevan, Sholinganallur (IN)

(73) Assignee: EKAHAA SOLUTIONS INDIA PVT LTD

( * ) Notice: Subject to any disclaimer, the term of this patent is extended or adjusted under 35 U.S.C. 154(b) by 0 days.

(21) Appl. No.: 17/985,180

(22) Filed: Nov. 11, 2022

(51) Int. Cl.
| | | |
|---|---|---|
| G06F 15/16 | (2006.01) | |
| G06F 9/54 | (2006.01) | |
| G06F 16/23 | (2019.01) | |
| G06F 21/62 | (2013.01) | |

(52) U.S. Cl.
CPC .............. G06F 9/547 (2013.01); G06F 16/23 (2019.01); G06F 21/6245 (2013.01)

(58) Field of Classification Search
CPC ....... G06F 9/547; G06F 16/23; G06F 21/6245
USPC .......................................... 709/203, 224–225
See application file for complete search history.

(56) References Cited

U.S. PATENT DOCUMENTS

| | | | | |
|---|---|---|---|---|
| 9,736,222 | B1 * | 8/2017 | Dahan | G06F 21/629 |
| 11,467,887 | B1 * | 10/2022 | Caudill | G06F 9/54 |
| 2016/0301739 | A1 * | 10/2016 | Thompson | H04L 67/561 |
| 2019/0230169 | A1 * | 7/2019 | Elangovan | G06F 9/547 |
| 2021/0336788 | A1 * | 10/2021 | Ziegler | H04L 12/66 |

* cited by examiner

*Primary Examiner* — Duyen M Doan
(74) *Attorney, Agent, or Firm* — Jose Cherson Weissbrot

(57) ABSTRACT

A system for abstraction of creation of an Application Programming Interface (API) without code is provided. The system includes a metadata repository, at least one authentication server, and at least one API server. The metadata repository is configured to store API metadata information and generate API signatures. The authentication server(s) is configured to check authorization of client application. The API server(s) is configured to receive an API call including credentials from client application; send a request including credentials to the authentication server(s); receive authorization token from the authentication server(s) upon successful authorization of client application; send first query including authorization token to metadata repository; receive, from metadata repository, API signature including input parameters of the API and definition of the API; send second query including API signature to target database; receive API response including target data that is retrieved from target database; and send API response to client application.

29 Claims, 5 Drawing Sheets

SYSTEM AND METHOD FOR ABSTRACTION OF APPLICATION PROGRAMMING INTERFACE CREATION WITHOUT CODE

FIELD OF THE INVENTION

The present invention generally relates to codeless Application Programming Interface (API) development, and, more particularly, to a system, a method and a computer program product for abstraction of creation of an Application Programming Interface (API) without code.

BACKGROUND OF THE INVENTION

An Application Programming Interface (API) is a set of definitions and protocols that allow one application to communicate with another application. APIs can be exposed through local files, as well as the web, to allow applications to communicate with each other. An API may be for a database system, operating system, computer hardware, or a web-based system.

Typically, API development process includes steps such as identification of data source, setting up API infrastructure, coding to define an API, more coding to define security policies, still more coding for documentation and for maintaining different API versions, and such similar steps until a step of testing and deployment of the API. Therefore, it can be understood that typical API development process is a heavy code-lifted approach. This leads to long product development cycles and release processes. Furthermore, this process is repeated every time a new data source is introduced, and is therefore cumbersome for a developer to implement it repeatedly. This is so because different data sources communicate differently, and understanding of semantics of each data source is important to be able to communicate with it effectively. Disparate data sources pose even more problems as it is challenging to unify and securely access all such disparate data sources using APIs. Moreover, standard REpresentational State Transfer (REST) APIs are developed with rigid input parameters. Making the input parameters as flexible increases a time duration of the API development process. Accordingly, there exists a need to overcome the aforementioned limitations associated with typical systems and processes for API development systems and an objective of the present invention is to provide a system and a method to effectively and considerably simplify the API development process.

SUMMARY OF THE INVENTION

In view of the foregoing disadvantages inherent in the prior art, the general purpose of the present invention is to provide a system, a method and a computer program product for abstraction of creation of an Application Programming Interface (API) without code to include all advantages of the prior art, and to overcome the drawbacks inherent in the prior art.

In one aspect of the present invention, a system for abstraction of creation of an Application Programming Interface (API) without code is provided. The system includes a metadata repository, at least one authentication server, and at least one API server communicably coupled to the metadata repository and the at least one authentication server. The metadata repository is configured to at least store API metadata information and generate API signatures using the API metadata information. The at least one authentication server is configured to check authorization of a client application. The at least one API server is configured to receive an API call from the client application, wherein the API call includes at least credentials provided by the client application; send a request to the at least one authentication server, wherein the request includes the credentials; receive an authorization token from the at least one authentication server in response to the request, when the at least one authentication server determines successful authorization of the client application based on the credentials; send a first query to the metadata repository, wherein the first query includes the authorization token in its header; receive, from the metadata repository, an API signature as a response to the first query, wherein the API signature includes at least input parameters of the API and a definition of the API, the API signature being generated by the metadata repository using the API metadata information; send a second query to a target database, wherein the second query includes the API signature; receive, from the target database, an API response to the second query, wherein the API response includes target data that is retrieved from the target database; and send the API response to the client application.

In another aspect of the present invention, a method for abstraction of creation of an Application Programming Interface (API) without code is provided. The method includes receiving an API call from a client application, wherein the API call includes at least credentials provided by the client application; sending a request to at least one authentication server, wherein the request includes the credentials; receiving an authorization token from the at least one authentication server in response to the request, when the at least one authentication server determines successful authorization of the client application based on the credentials; sending a first query to a metadata repository, wherein the first query includes the authorization token in its header; receiving, from the metadata repository, an API signature as a response to the first query, wherein the API signature includes at least input parameters of the API and a definition of the API, the API signature being generated by the metadata repository using API metadata information stored at the metadata repository; sending a second query to a target database, wherein the second query includes the API signature; receiving, from the target database, an API response to the second query, wherein the API response includes target data that is retrieved from the target database; and sending the API response to the client application.

In yet another aspect of the invention, a computer program product is provided. The computer program product includes a non-transitory machine-readable data storage medium having stored thereon program instructions. The program instructions, when accessed by a processing device, cause the processing device to: receive an API call from a client application, wherein the API call includes at least credentials provided by the client application; send a request to at least one authentication server, wherein the request includes the credentials; receive an authorization token from the at least one authentication server in response to the request, when the at least one authentication server determines successful authorization of the client application based on the credentials; send a first query to a metadata repository, wherein the first query includes the authorization token in its header; receive, from the metadata repository, an API signature as a response to the first query, wherein the API signature includes at least input parameters of the API and a definition of the API, the API signature being generated by the metadata repository using API metadata information stored at the metadata repository; send a second query to a target database, wherein the second query includes the API signature; receive, from the target database, an API response to the second query, wherein the API response includes target data that is retrieved from the target database; and send the API response to the client application.

This together with the other aspects of the present invention, along with the various features of novelty that characterize the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like components throughout the detailed description of the invention in conjunction with drawings.

DETAILED DESCRIPTION OF THE INVENTION

Figure 1:
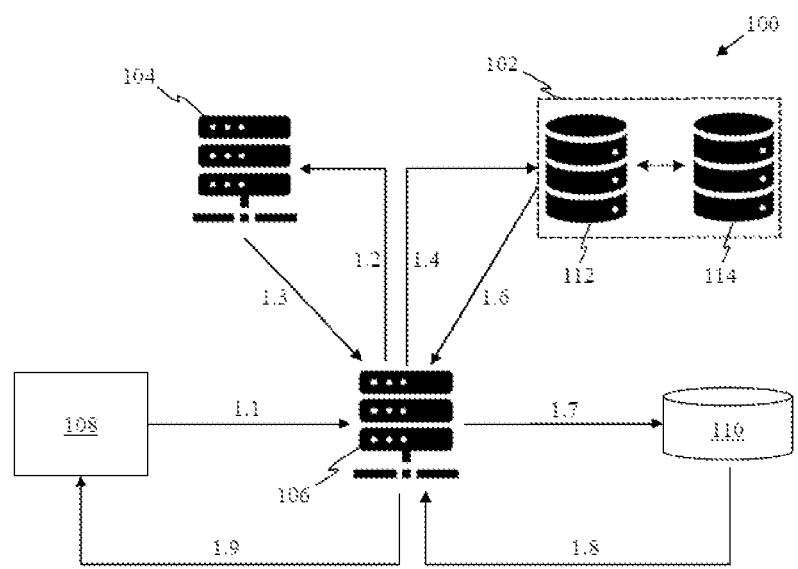
FIG. 1 illustrates a schematic block diagram of the system for abstraction of creation of an Application Programming Interface (API) without code, in accordance with an embodiment of the present invention.

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The terms, "a" and "an" herein do not denote a limitation of quantity, but rather denote the presence of at least one of the referenced items.

The present invention provides a system for abstraction of creation of an Application Programming Interface (API) without code. The system includes a metadata repository, at least one authentication server, and at least one API server communicably coupled to the metadata repository and the at least one authentication server. The metadata repository is configured to at least store API metadata information and generate API signatures using the API metadata information. The at least one authentication server is configured to check authorization of a client application. The at least one API server is configured to receive an API call from the client application, wherein the API call includes at least credentials provided by the client application; send a request to the at least one authentication server, wherein the request includes the credentials; receive an authorization token from the at least one authentication server in response to the request, when the at least one authentication server determines successful authorization of the client application based on the credentials; send a first query to the metadata repository, wherein the first query includes the authorization token in its header; receive, from the metadata repository, an API signature as a response to the first query, wherein the API signature includes at least input parameters of the API and a definition of the API, the API signature being generated by the metadata repository using the API metadata information; send a second query to a target database, wherein the second query includes the API signature; receive, from the target database, an API response to the second query, wherein the API response includes target data that is retrieved from the target database; and send the API response to the client application.

The present invention also provides a method for abstraction of creation of an Application Programming Interface (API) without code. The method includes receiving an API call from a client application, wherein the API call includes at least credentials provided by the client application; sending a request to at least one authentication server, wherein the request includes the credentials; receiving an authorization token from the at least one authentication server in response to the request, when the at least one authentication server determines successful authorization of the client application based on the credentials; sending a first query to a metadata repository, wherein the first query includes the authorization token in its header; receiving, from the metadata repository, an API signature as a response to the first query, wherein the API signature includes at least input parameters of the API and a definition of the API, the API signature being generated by the metadata repository using API metadata information stored at the metadata repository; sending a second query to a target database, wherein the second query includes the API signature; receiving, from the target database, an API response to the second query, wherein the API response includes target data that is retrieved from the target database; and sending the API response to the client application.

The present invention further provides a computer program product. The computer program product includes a non-transitory machine-readable data storage medium having stored thereon program instructions. The program instructions, when accessed by a processing device, cause the processing device to: receive an API call from a client application, wherein the API call includes at least credentials provided by the client application; send a request to at least one authentication server, wherein the request includes the credentials; receive an authorization token from the at least one authentication server in response to the request, when the at least one authentication server determines successful authorization of the client application based on the credentials; send a first query to a metadata repository, wherein the first query includes the authorization token in its header; receive, from the metadata repository, an API signature as a response to the first query, wherein the API signature includes at least input parameters of the API and a definition of the API, the API signature being generated by the metadata repository using API metadata information stored at the metadata repository; send a second query to a target database, wherein the second query includes the API signature; receive, from the target database, an API response to the second query, wherein the API response includes target data that is retrieved from the target database; and send the API response to the client application.

Referring to FIG. 1, illustrated is a schematic block diagram of a system 100 for abstraction of creation of an Application Programming Interface (API) without code. The system 100 comprises a metadata repository 102, at least one authentication server 104, and at least one API server 106. The metadata repository 102 is configured to at least store API metadata information and generate API signatures using the API metadata information. The at least one authentication server 104 is configured to check authorization of a client application 108. The at least one API server 106 is communicably coupled to the metadata repository 102 and the at least one authentication server 104. The at least one API server 106 is configured to: receive (at 1.1) an API call from the client application 108, wherein the API call includes at least credentials provided by the client application 108; send (at 1.2) a request to the at least one authentication server 104, wherein the request includes the credentials; receive (at 1.3) an authorization token from the at least one authentication server 104 in response to the request, when the at least one authentication server 104 determines successful authorization of the client application 108 based on the credentials; send (at 1.4) a first query to the metadata repository 102, wherein the first query includes the authorization token in its header; receive (at 1.6), from the metadata repository 102, an API signature as a response to the first query, wherein the API signature includes at least input parameters of the API and a definition of the API, the API signature being generated by the metadata repository 102 using the API metadata information; send (at 1.7) a second query to a target database 110, wherein the second query includes the API signature; receive (at 1.8), from the target database 110, an API response to the second query, wherein the API response includes target data that is retrieved from the target database 110; and send (at 1.9) the API response to the client application 108.

The metadata repository 102 is implemented as a data repository. The term "data repository" refers to hardware, software, firmware, or a combination of these for storing a given information in an organized (namely, structured) manner, thereby, allowing for easy storage, access (namely, retrieval), updating and analysis of the given information. The data repository may be implemented as a memory of a device (such as the at least one API server 106, or similar), a removable memory, a cloud-based memory, or similar. The data repository can be implemented using one or more storage devices. In an embodiment, the metadata repository 102 comprises a metadata cache 112 and metadata main memory 114 that are communicably coupled and synchronized with each other, wherein the metadata cache 112 returns the response to the first query. The metadata main memory 114 is a primary memory (i.e., a main storage) associated with the at least one API server 106. The metadata main memory 114 may also be commonly known as a Random Access Memory (RAM) associated with the at least one API server 106 and may be internal to the at least one API server 106. The metadata cache 112 is a cache memory that is implemented between the at least one API server 106 and the metadata main memory 114. The metadata cache 112 is smaller than the metadata main memory 114 and has a smaller access time as compared to the metadata main memory 114. In some instances, the metadata cache 112 may already have stored therein all information for returning the response to the first query at a time of receiving the first query. In such instances, the metadata cache 112 provides the response to the first query in a minimal time (thus having minimal latency). In other instances, the metadata cache 112 may not have stored therein all information for returning the response to the first query at a time of receiving the first query. In such instances, the metadata cache 112 fetches missing information from the metadata main memory 114 and then provides the response to the first query. Optionally, the at least one API server 106 is further configured to implement a cache management policy to manage data stored in the metadata cache 112. The cache management policy defines how data is inserted in the metadata cache 112 and is removed from the metadata cache 112. This enables in ensuring optimal performance of the metadata repository 102.

The metadata repository 102 is configured to at least store the API metadata information. In an embodiment, the API metadata information comprises at least two of: input parameters of APIs, definitions of APIs, columns, data security-related information, policies, profiles, rules, data filters, data sorting criteria, a structure of the API response, other API-related information, configuration information and meta-information pertaining to target databases that are communicably coupled to the at least one API server 106. The "input parameters" of a given API are those parameters that pass required information to the given API, in order to enable the given API to perform its function. The input parameters are required to be set before making the second query, as they enable the given API to perform its function and return the API response to the second query. The "definition" of a given API is a description of the given API that elucidates features of the given API, terms of use of the features, availability of API description and its related documentation, and the like. Optionally, the definition of the API includes a set of rules according to which communication occurs between the client application 108 and the target database 110, and wherein the set of rules comprises one or more validation rules that can be applied to the target data. The validation rules are based on one or more attributes and enable in determining the API response. It will be appreciated that the metadata repository 102 stores the input parameters and definitions for multiple APIs and not just one API. The "columns" are a list of attributes that should be displayed in the API response. This list of attributes may include one or more attributes; hence the API metadata information may comprise one or more columns. Columns define pagination of the API response. The "data security-related information" refers to information pertaining to secure accessibility of the target data by the client application 108. The data security-related information can include, for example, identifiers of which rows and/or columns of data stored in the target database 110 are eligible to be accessed by the client application 108, criteria and/or techniques to implement dynamic masking of the target data, how to encrypt and decrypt the target data, secure data transfer protocols to be employed, and the like. Data security in APIs is an important feature in API development for protection of the target data. The "policies" are principles pertaining to accessibility of the API. For example, the policies may describe who can access the API. In such a case, client applications of a certain type may not be able to access the API whereas client applications of another type may be allowed to access the API. The "profiles" refer to user profiles for which the API would retrieve the target data. The "rules" are a set of regulations or principles that govern a procedure of processing the target data that is to be retrieved in the API response. The rules could include validation rules (i.e., a list of rules that can be applied before processing, during processing, and after processing of the data), transformation rules (i.e., a list of data transformations that can be applied before processing, during processing, and after processing of the data), and similar. The "data filters" include a list of conditions that can be applied to the data stored in the target database 110 for obtaining filtered results, wherein the filtered results are included in the target data. The "data sorting criteria" refers to criteria according to which the target data is to be ordered. The data sorting criteria may be based on one or more columns. The "structure of the API response" is a format of how the columns should be arranged in the API response. The "other API-related information" encompasses a portion or an entirety of other information that is related to the API. The "configuration information and meta-information" pertaining to the target databases that are communicably coupled to the at least one API server 106 are target data source-specific information. Such information is important for ensuring proper communication between the target databases and the client application 108.

The metadata repository 102 is configured to generate the API signatures using the API metadata information. The "API signature" is a string which represents at least information about the API call. Additionally, the API signature can also represent information about the client application 108 (such as the credentials provided by the client application 108, a user profile associated with the client application 108, or similar). The API signature may be encoded and can be transformed by a cryptographic hash.

The at least one authentication server 104 is a server that facilitates authentication of the client application 108, when the client application 108 makes the API call. The client application 108 makes the API call to the at least one API server 106, and provides the credentials to be used for said authentication in the API call. In an embodiment, the credentials comprise at least one of: a name, a password, an identification code, an authentication token, a key, a client secret, a grant type, a target audience, a status, an action. Optionally, the credentials correspond to a given protocol for authentication. As an example, the credentials may be OAuth2.0 credentials. Optionally, when checking the authorization of the client application 108, the at least one authentication server 104 is configured to: match the credentials provided by the client application 108 in the API call against reference credentials of authorized applications that are pre-stored in the at least one authentication server 104; and generate the authorization token when the credentials match with at least one of the reference credentials, wherein such matching indicates the successful authorization of the client application 108 based on the credentials. Different APIs may have different authorized applications (i.e., a client application that is authorized to access a given API may not be authorized to access another API). When the credentials provided by the client application 108 in the API call do not match with at least one of the reference credentials (pre-stored for the API), authorization of the client application 108 is unsuccessful and the client application 108 is not allowed access to the data stored in the target database 110. Therefore, successful authorization of the client application 108 based on the credentials is an essential requirement for the client application 108 to access the data stored in the target database 110. The "authorization token" is an access token that the at least one API server 106 uses to make requests to the target data sources. The authorization token provides the client application 108 with access to the target database 110, via the at least one API server 106. A format of the authorization token is selected based on the given protocol for authentication, when the credentials correspond to the given protocol. For example, the authorization token may be a JSON Web Token (JWT), wherein JSON is JavaScript Object Notation. A JWT is used to share security information between two parties—the at least one API server 106 and at least one target data source.

Optionally, the client application 108 is any application that is capable of making API calls and receiving API responses, the client application 108 being executable by at least one of: a user, a semi-automated process, an automated process, another application. In this regard, the user may, for example, be an API developer, an API tester, a computer science enthusiast, an end client of the system 100, a system administrator, and the like. The creation of the API without code is performed when the client application 108 calls the API. The client application 108 may support at least one user profile, wherein a given user profile has certain credentials associated therewith. Different user profiles would have different credentials, and may have different access authorizations. For example, a user profile X1 may be authorized to access data stored in ten target databases whereas a user profile X2 may be authorized to access data stored in only two target databases.

The target database 110 is implemented on at least one target data source. In particular, the at least one target data source is communicably coupled to the at least one API server 106, for enabling communicable coupling between the target database 110 and the at least one API server 106. The target database 110 can be a relational database, a non-relational database, or similar. The target database 110 may include one or more of structured data, unstructured data, semi-structured data, third party applications or objects, and the like. In some cases, the target database 110 is implemented on a single target data source whereas in other cases, the target database 110 is implemented on a plurality of target data sources. It will be appreciated that each target data source communicates in its own language. In other words, each target data source has different semantics which are required to be understood in order to communicate with such target data source. Examples of the at least one target data source include, but are not limited to, an Oracle data source, a Structured Query Language (SQL) Server, a MySQL data source, a Postgres data source, a DB2 data source, a MongoDB data source, a Cassandra data source, a Redis data source, a Snowflake data source, a TIBCO data virtualization server, a SOAP data source, an Open API data source, a Flat files data source, and an AWS S3 data source. Optionally, the plurality of target data sources that are disparate. Disparate target data sources can be easily onboarded to a platform for abstraction of creation of the API without code at different times. The at least one API server 106 supports unification of the plurality of target data sources through a single unified interface without knowing their underlying semantics and complexities.

The at least one API server 106 is an interface between client applications and the at le at least one target data source. In broad terms, the at least one API server 106 receives API calls from client applications and communicates with the at least one target data source to provide API responses to the API calls. In doing so, the at least one API server 106 also verifies authorization of the client application 108 and only provides the API responses upon successful authorization. The at least one API server 106 serves as a central processing resource of the system 100 that communicates with all other elements of the system 100. The at least one API server 106 is communicably coupled to the metadata repository 102 and the at least one authentication server 104 via a communication network. The communication network may be an individual network or a collection of multiple individual networks. The communication network may be a wireless network, a wired network, or any combination thereof. Examples of the communication network include, but are not limited to, a radio wave-based network (for example a network employing Wi-Fi, a cellular network, and the like), the Internet, a local area network (LAN), and a wireless LAN.

The at least one API server 106 sends the first query to the metadata repository 102. The first query includes the authorization token in its header. Querying the metadata repository 102 is essential for the at least one API server 106 to understand semantics of the at least one target data source upon which the target database 110 is implemented. Then the at least one API server 106 receives, from the metadata repository 102, the API signature as the response to the first query. The API signature includes at least input parameters of the API and the definition of the API. The at least one API server 106 reads the API signature to understand the semantics of the at least one target data source for effectively communicating therewith. The response to the first query is optionally received in real time or near-real time.

Optionally, the API call also includes at least one parameter that is requested by the client application 108, wherein the at least one parameter is included amongst the input parameters of the API. A given parameter that is expressly requested by the client application 108 in the API call may be known as a "called parameter". Called parameters are added to API calls when the API response is required to meet certain requirements. Any number of parameters may be requested by the client application 108, as per requirement. The API call including called parameter(s) serves as an input to the API. As an example, the API call may include two parameters requested by the client application 108, the two parameters being a range of records that is required in the target data and a format of the API response.

Optionally, the input parameters of the API are dynamically selected based on at least one of: a parameter called in the API call, a default parameter of the API. The parameter called in the API call is expressly requested by the client application 108 and thus is essentially required to be selected as an input parameter. In case the API call does not include a parameter when it should have been called, a default parameter is called in place of said parameter. The default parameter of the API is stored in the metadata repository 102. It is also feasible that some parameters be called in the API call while some parameters are not called and thus default parameters are used in their place. In this way, the selection of input parameters of the API is made dynamically (i.e., flexibly) by checking the parameters called in the API call and utilizing such called parameters and/or default parameters. Moreover, making the input parameters of the API as flexible in this way does not increase a time duration of the API development process.

Optionally, the input parameters of the API comprise at least two of: a range of records that is required in the target data, a list of attributes, a format of the API response, a user profile for which the target data is being retrieved, a secret used to ensure impersonation access, a definition of whether additional metadata should be sent as a part of the API response, validation rules that can be applied to the target data. The "range of records" can be specified when only a portion of the target data is required to be retrieved and not an entirety of the data. The "list of attributes" is a list of the columns that should be sent back in the API response. The "format" of the API response could be any suitable format that is providable by the target database 110 and is readable by the client application 108. The format of the API response may, for example, be JSON. The "secret" is an identification code which is used to ensure that a user profile making the API call by impersonating another user profile actually has authority to make such impersonation. The "definition of whether additional metadata should be sent as the part of the API response" is required to know whether the API response is to be lean or not. The "validation rules" can be applied to the target data before, during and after processing the data stored in the target database 110 to retrieve the target data. As an example, the API may have the following parameters: {"from":1,"to":10,"columns":"*","pipes":" ","format":"application/json","forUser":"user@email.com","forUserSecret":"{{var_foruser_secret}}","lean":true,"rules":   " "}. These parameters may have been called in the API call and/or may be default parameters.

Then, the at least one API server 106 sends the second query to the target database 110, wherein the second query includes the API signature. The second query is a secure query. The target data is retrieved by the target database 110 based on the API signature, and is sent by the target database 110 to the at least one API server 106 in the API response. The at least one API server 106 then sends the API response to the client application 108. Upon such sending, the API call made by the client application 108 can be considered to be served. In the above process, no physical code is generated for the APL The target data can be understood to be a body of the API response. The API response may also include a header, network information, other information, and the like. The target data may be a portion of the data stored in the target database 110 or may be an entirety of the data stored in the target database 110. It will be appreciated that the API call can be made not just for target data retrieval, but also for target data manipulation (i.e., target data editing, reorganizing, deletion), creation of new target data, or similar. In such a case, the API responses would also change correspondingly. For example, if the API call is to edit the target data, the API call may include the edited target data.

Optionally, the at least one API server 106 is further configured to apply at least one transformation to the target data in the API response, prior to sending the API response to the client application 108, the at least one transformation being at least one of: a linear data transformation, a non-linear data transformation, an aggregation transformation.

The at least one transformation can be applied to any form of the target data, such as structured data, unstructured data, or a combination of these. The at least one transformation can be applied on the fly (i.e., while the API response is being sent by the at least one API server 106 to the client application 108). The at least one transformation pertains to data manipulation, data filtering, data sorting, data reformation, and the like. Examples of the at least one transformation include, but are not limited to, a letter case conversion, application of a mathematical operation, extraction of a part of the target data, dynamic masking of sensitive information, application of a data filter, introduction of a new field. Whether the at least one transformation is required or not depends on requirements specified in the API call. In an example, the at least one API server 106 may apply the letter case conversion to convert the target data from upper case to lower case. In another example, the at least one API server 106 may extract only a certain part of a string in the target data. If the string is a date, the at least one API server 106 may extract a date or a month or a year from it. In yet another example, the at least one API server 106 may dynamically mask a few digits in a credit card number, a phone number, a social security number, and the like. In still another example, the at least one API server 106 may apply a data filter to filter out data entries prior to a given date from the target data. Data filters may be applied based on certain criteria or policies, as required. In yet another example, the at least one API server 106 may introduce a new field of "SUM" after applying a summation mathematical operation on two existing fields, and/or may introduce a standalone new field such as "DATE", "Serial Number", and the like.

Optionally, the at least one transformation is applied to the target data using at least one pipe. Optionally, in this regard, the at least one pipe is specified in the API call, wherein specifying the at least one pipe in the API call indicates that the at least one transformation is required. Herein a "pipe" is a digital tool (i.e., a software connection) which passes the target data from one processing stage to another by applying a processing operation upon the target data. The pipe allows tailoring/transformation of the API response as required. A given pipe can be associated with parameters that define inputs and outputs of the given pipe. These parameters are editable and can be changed as per requirement. Pipes can also be added or deleted as required. As an example, the at least one transformation may be applied using three pipes—a case transformation pipe for implementing the letter case conversion, a data extension pipe for introducing a new field in the target data, and a linear mapping pipe for transforming a flat end structure to a hierarchical structure.

Optionally, the at least one transformation comprises a plurality of transformations, the plurality of transformations being applied to the target data in a sequential manner and/or in a parallel manner. In this regard, the at least one API server 106 could perform only sequential application of transformations, only parallel application of transformations, or parallel/sequential application of transformations followed by sequential/parallel application of transformations. In an embodiment, the plurality of transformations are applied to the target data in the parallel manner when said transformations are applicable upon different columns in the target data. The parallel manner of applying the plurality of transformations enables fast processing of the target data by the at least one API server 106. The sequential manner of applying the plurality of transformations can be implement easily with low computational costs. Optionally, the plurality of transformations are applied to the target data using a plurality of pipes. Optionally, in this regard, a pipe sequence defines the sequential manner in which the plurality of pipes are chained with respect to each other. When the plurality of pipes are chained in the sequential manner, an output of a given pipe is passed as in input of a next pipe that succeeds the given pipe in the pipe sequence.

Optionally, the at least one API server 106 is further configured to provide the client application 108 with access to the API metadata information stored in the metadata repository 102, the API metadata information being usable by a user of the client application 108 to develop software applications on a given platform. The API metadata information stored in the metadata repository 102 is readily consumable by the user of the client application 108. The given platform is a platform to which the end user has access and that supports development of the software applications. The given platform may, for example, be provided by: the client application, another application, the at least one API server 106, or similar. Using such API metadata information for developing the software applications reduces a coding requirement for API functionality that is typically associated with the software applications.

Figure 2:
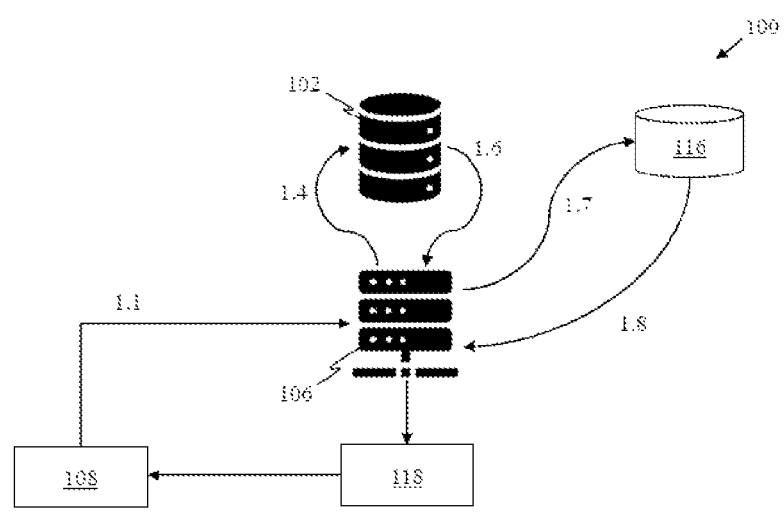
FIG. 2 illustrates enforcement of a multi-tier data security configuration for data governance in the system, in accordance with an embodiment of the present invention.

Referring to FIG. 2, illustrated is enforcement of a multi-tier data security configuration for data governance in the system 100, in accordance with an embodiment of the present invention. Optionally, the at least one API server 106 is further configured to enforce the multi-tier data security configuration for data governance, the multi-tier data security configuration comprising at least two of: a user profile-based security, role-based access control, payload encryption, secure transfer, metadata encryption. The multi-tier data security configuration protects the target data. The multi-tier data security configuration is not limited to any specific number of tiers. Tiers can be added or deleted as per requirement. The multi-tier data security configuration is enforced with a shift-left approach. The "user profile-based security" encompasses security techniques for controlling data access at ROW and FIELD levels based on a user profile using which the API call is made from the client application 108, enforcing dynamic masking of the target data based on the user profile, and the like, which protect data visibility. The user profile is an attribute which is used to control data filters. Defining user profiles enables "Row-level security" and can be used to enforce "column-level security". The "role-based access control" encompasses controlled API access of the target data in totality. This enables data security at the resource level, row-level, and column level. By default, all the target data is masked for any user profile. The "payload encryption" includes RSA key pair-based encryption for classified target data sources which ensures that only a receiver with a private key of the RSA key pair can decrypt the target data from such target data sources. As an example, for a classified target data source 116, the at least one API server 106 may employ an encryption module 118 to encrypt all target data being retrieved from the classified target data source 116 using a public key. The "secure transfer" encompasses use of secure protocols to provide data security in transit when the target data is transmitted over a network. The "metadata encryption" encompasses leveraging complex encryption techniques like AES 256+salt-based security for encrypting the API metadata information.

Figure 3:
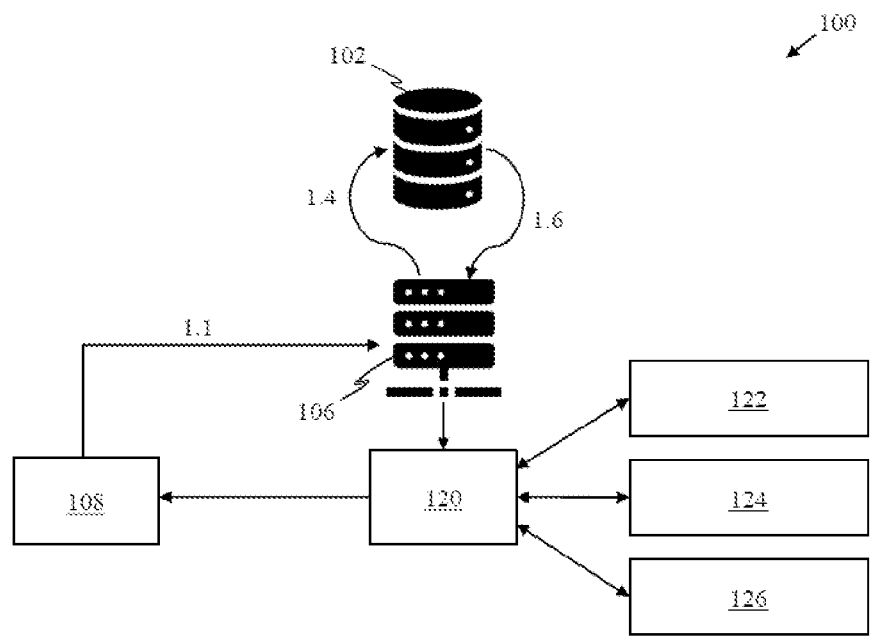
FIG. 3 illustrates how an auto-documentation process is executed in the system, in accordance with an embodiment of the present invention.

Referring to FIG. 3, illustrated is how an auto-documentation process is executed in the system 100, in accordance with an embodiment of the present invention. Optionally the at least one API server 106 is further configured to execute the auto-documentation process that utilizes the API metadata information to automatically generate at least one document pertaining to the API. The auto-documentation process enables in easing testing and development of the API (by, for example, a developer). When executing the auto-documentation process, the at least one API server 106 is configured to execute an auto-documenter 120 to: send, in the first query, a request for requisite documentation information from amongst the API metadata information; receive the requisite documentation information along with the API signature (which is the response to the first query); and process the requisite documentation information to generate the at least one document pertaining to the API. Optionally, the at least one document pertaining to the API is in form of at least one of: a collection 122 in an API platform, a documentation 124 of an API development suite, a spreadsheet document 126, a text document, an image. The API platform may, for example, be POSTMAN®. The API development suite may, for example, be SWAGGER API®. As an example, in the spreadsheet document 126, different tabs may represent different information such as information about the at least one target data source, the API, the at least one pipe, data filters, other supported services, and the like. It will be appreciated that all suitable formats of the at least one document are feasible, as long as they are in readable by the client application 108. Optionally, the at least one API server 106 executes the auto-documentation process upon receiving an input to do so, from the client application 108. This input may be provided prior to making the API call, along with the API call, after making the API call, and the like. Optionally, the input is indicative of a required format of the at least one document. In such a case, the auto-documenter 120 generates the at least one document in the required format.

Figure 4:
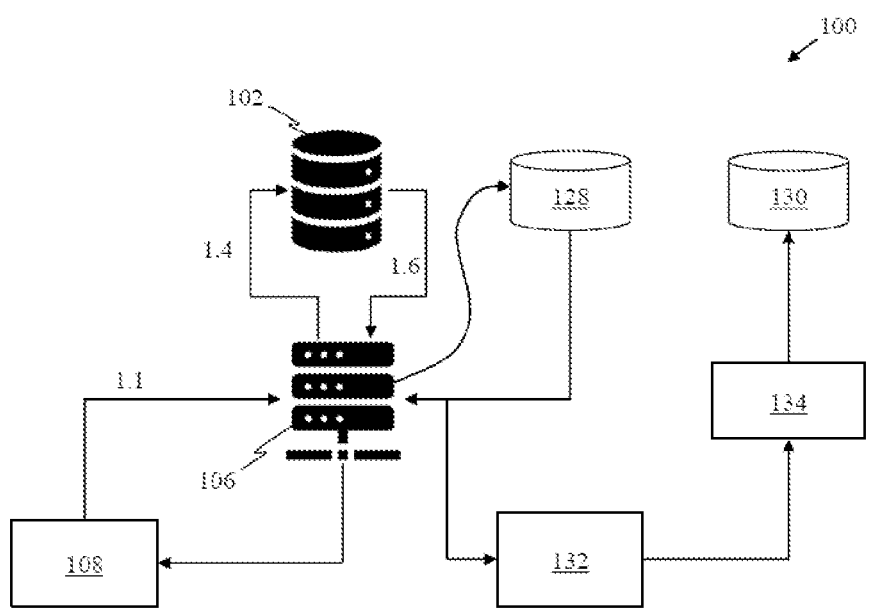
FIG. 4 illustrates how events are created in the system, in accordance with an embodiment of the present invention.

Referring to FIG. 4, illustrated is how events are created in the system 100, in accordance with an embodiment of the present invention. Optionally, the API call pertains to a Create, Read, Update or Delete (CRUD) operation, and wherein the at least one API server 106 is further configured to create at least one event based on the CRUD operation, the at least one event triggering at least one data process. The CRUD operation is a basic database operation that can be performed on the target database 110. The CRUD operation is performed based on a request verb in the API call. In operation, the CRUD operation to be performed is indicated in the second query, and a result of the CRUD operation is the target data received as the API response to the second query. The CRUD operation can be implemented on one or more target data source (depicted at a first target data source 128), and in turn, can optionally trigger the at least one data process on one or more other target data source (depicted as a second target data source 130). Such triggering would occur when there exists a data flow (i.e., movement and/or interrelation of data) between one or more target data source and the one or more other target data source. The at least one event is created for execution of the at least one data process that is triggered. The at least one data process may be a data manipulation process, a data restructuring process, a data addition/deletion process, or similar. As an example, the second target data source 130 may maintain a copy of data stored at the first target data source 128. Therefore, upon manipulation of a portion/entirety of the data stored at the first target data source 128 a corresponding portion/entirety of data stored at the second target data source 130 is required to be manipulated in the same manner. Thus, an event triggering a data manipulation process would be triggered. Optionally, the at least one API server 106 executes an event generator 132 to create the at least one event based on the CRUD operation. The event generator 132 is a software application/module. REST is the de-facto standard for the CRUD operation, and the event generator 132 leverages this standard to its advantage and allows publishing of the target data as a service.

Optionally, the at least one data process comprises at least one data subscription process that, when executed, propagates changes in data from one target data source to another target data source. Optionally, the at least one API server 106 executes a data subscriber 134 to execute the at least one data subscription process. The at least one data subscription process is a process that runs between the one target data source to the other target data source, said process having an advance arrangement of being informed of any future changes in the data stored at the one target data source. In other words, the at least one data subscription process provides a changed-data capture (CDC) functionality for the one target data source. The CDC functionality not only informs of the changes in the data stored at the one target data source, but also of what the changes are (i.e., actual details about the changes). In this way, the at least one data subscription process efficiently and accurately propagates the changes in the data from the one target data source to the other target data source. The at least one data subscription process is required to be executed upon creation of the at least one event, in order to ensure maintenance of the data flow. Additionally, the at least one data subscription process could also be executed according to a subscription schedule (for example, hourly, daily, weekly, or similar), on demand by the client application 108, or similar. The data subscriber 134 is a software application/module. The APIs are designed to cater to subscriptions for batch processing, online transaction processing (OLTP), online analytical processing (OLAP), and similar data processing needs. In the example illustrated in FIG. 2, the one target data source is represented as the first target data source 128 and the other target data source is represented as the second target data source 130.

Figure 5:
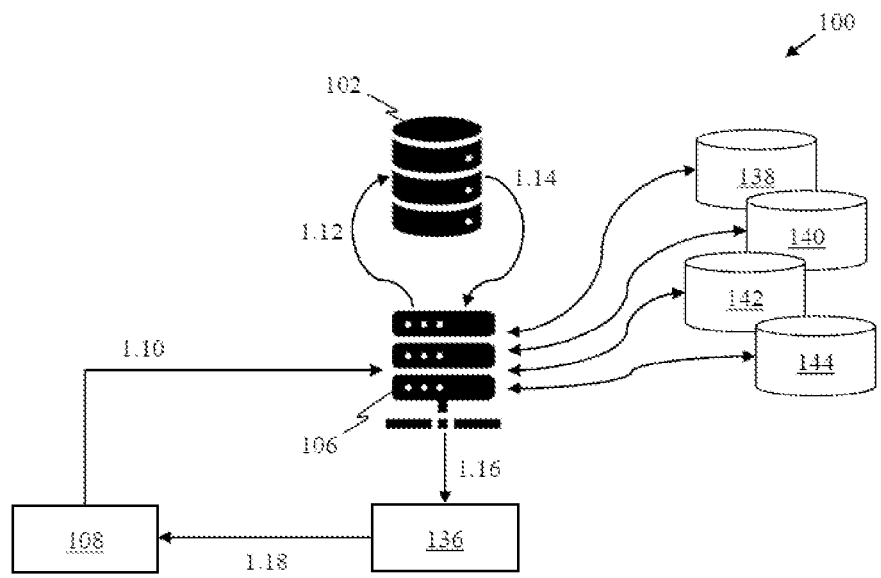
FIG. 5 illustrates how data visualization is enabled by the system, in accordance with an embodiment of the present invention.

Referring to FIG. 5, illustrated is how data visualization is enabled by the system 100, in accordance with an embodiment of the present invention. The data visualization is optionally enabled by the system 100 to facilitate data analysis. The system 100 optionally provides dynamic dashboards for visualization of the data. The dynamic dashboards are provided for displaying consolidated views of data stored across the at least one target data source (and optionally, across the plurality of target data sources that are disparate). The data visualization is enabled by a data visualization module 136, that is executed by the at least one API server 106. The data visualization module 136 is a software application/module. Enablement of the data visualization is described in more detail hereinbelow.

Optionally, the metadata repository 102 is configured to also store dashboard metadata information, and wherein the at least one API server 106 is further configured to:

receive a dashboard view request (at 1.10) from the client application 108, wherein the dashboard view request includes a selection of one or more target data sources whose data is to be visualized on at least one dashboard;

send (at 1.12) a third query to the metadata repository 102, the third query being based on the dashboard view request;

receive (at 1.14), from the metadata repository 102, a portion of the dashboard metadata information corresponding to the third query; and execute (at 1.16) the data visualization module 136 to enable visualization of the data of the one or more target data sources, using the portion of the dashboard metadata information.

In this regard, the dashboard metadata information refers to information pertaining to rendering of dynamic dashboards for data visualization. The dashboard metadata information includes, but is not limited to, a layout of a given dashboard, a number of tiles in the given dashboard, a size of the tiles in the given dashboard, positioning of the tiles in the given dashboard, meta-information pertaining to the at least one target data source communicably coupled to the at least one API server 106, information related to the APIs, information related to the input parameters of the APIs, and display parameters (for example, representations such as tables, charts, line diagrams, images, bars, customized representations, and the like). Examples of the charts include, but are not limited to, pie charts, bar charts, line charts, donut charts, metrics charts, and gauge charts. The dashboard view request may be provided before making the API call, along with the API call, or after making the API call. The selection of the one or more target data sources whose data is to be visualized on the at least one dashboard is made: by a user of the client application 108, automatically by the client application 108, by an automated process, by another application, or similar. As an example, the dashboard view request includes a selection of four target data sources 138, 140, 142, and 144. The third query includes at least the (selected) one or more target data sources in the dashboard view request. The metadata repository 102 processes the third query to retrieve the portion of the dashboard metadata information corresponding to the third query, and then send said portion to the at least one API server 106. The data visualization module 136 is then executed by the at least one API server 106 to enable visualization of the data of the one or more target data sources according to the portion of the dashboard metadata information. Upon execution, the data visualization module 136 sends (at 1.18) at least one view of the at least one dashboard to the client application 108.

Figure 6:
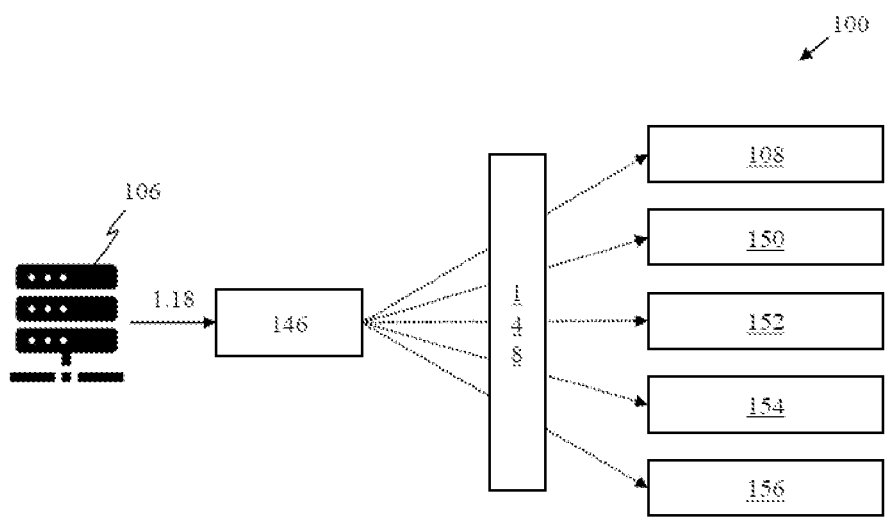
FIG. 6 illustrates how notifications are provided by the system, in accordance with an embodiment of the present invention.

Referring to FIG. 6, illustrated is how notifications are provided by the system 100, in accordance with an embodiment of the present invention. Optionally, the at least one API server 106 is further configured to provide push notifications to the client application 108 to notify a user of the client application 108 of ongoing activities on a platform for abstraction of creation of the API without code. Optionally, the push notifications are provided to the client application 108 by a push notifications handler 146. Optionally, in this regard, the push notifications handler 146 uses WebSocket technology 148. The WebSocket technology 148 enables communication between the push notifications handler 146 and a plurality of client applications (depicted as client applications 108, 150, 152, 154, 156). The push notifications handler 146 identifies at least one notification target from amongst the plurality of client applications 108, 150, 152, 154, 156 so as to send the push notifications to an intended, appropriate audience. The push notifications handler 146 is a software application/module that is executed (at 1.18) by the at least one API server 106. The platform for abstraction of creation of the API without code is provided by the at least one API server 106. Said "platform" is a digital platform or a computing platform that hosts an application or a service for abstraction of creation of the API without code. The platform is a hardware, software, firmware, or a combination of these. The platform is a low-code/no-code solution that enables the client application 108 to communicate with a variety of target data sources using a single unified language. The platform allows unification, rectification, fortification, and democratization of data. When the user of the client application 108 of ongoing activities on the platform, the user can accordingly take actions, give instructions to a notification system (comprising the push notifications handler 146), or similar.

Figure 7:
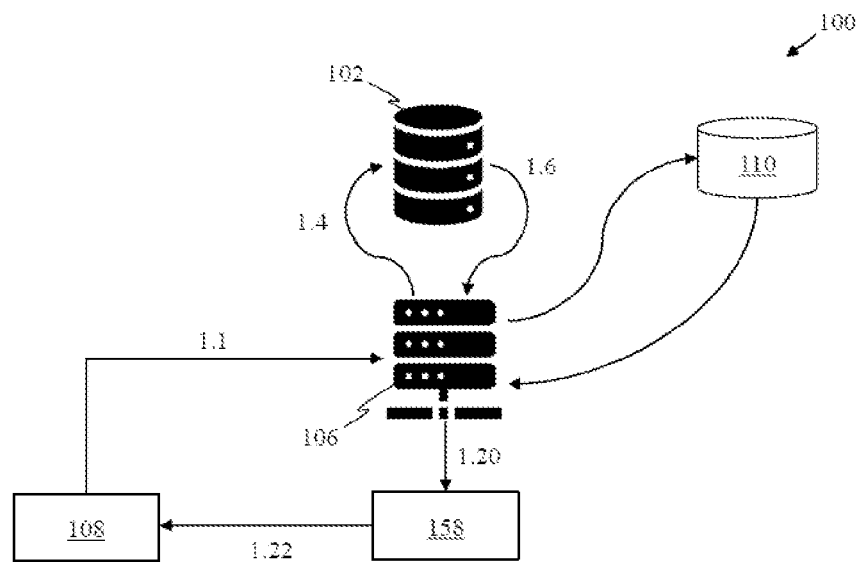
FIG. 7 illustrates how a data streaming technique is leveraged by the system, in accordance with an embodiment of the present invention.

Referring to FIG. 7, illustrated is how a data streaming technique is leveraged by the system 100, in accordance with an embodiment of the present invention. Optionally, when sending the API response to the client application 108, the at least one API server 106 is configured to leverage the data streaming technique to ensure that at any given time, only a required portion of the target data is sent from the target database 110 to the client application 108. The data streaming technique enables the at least one API server 106 to handle large datasets without overburdening its processing resources, memory, or similar. This enhances performance of the at least one API server 106 and prevents system failures. The data streaming technique is implemented by a data streamer 158. The at least one API server 106 is configured to execute (at 1.20) the data streamer 158. The data streamer 158 is a software application/module. Optionally, the data streamer 158 employs at least one data streaming pipe to stream (at 1.22) the target data to the client application 108. The required portion of the target data that is to be sent at a given time may be selected (by the data streamer 158) based on at least one criterion employed by the data streaming technique, a parameter called in the API call, a data streaming requirement, a default streaming criterion, a streaming capacity, or similar. The entire dataset of the target data is not sent at once to the client application 108 but is streamed as portions of the target data over a period of time. The data streaming technique provides support for batch processing, OLTP, OLAP, and similar data processing needs. As an example, the data streaming technique provides filtering, sorting and pagination support for OLTP applications. The data streaming technique streams the target data to the client application 108 without storing the target data anywhere in between.

Figure 8:
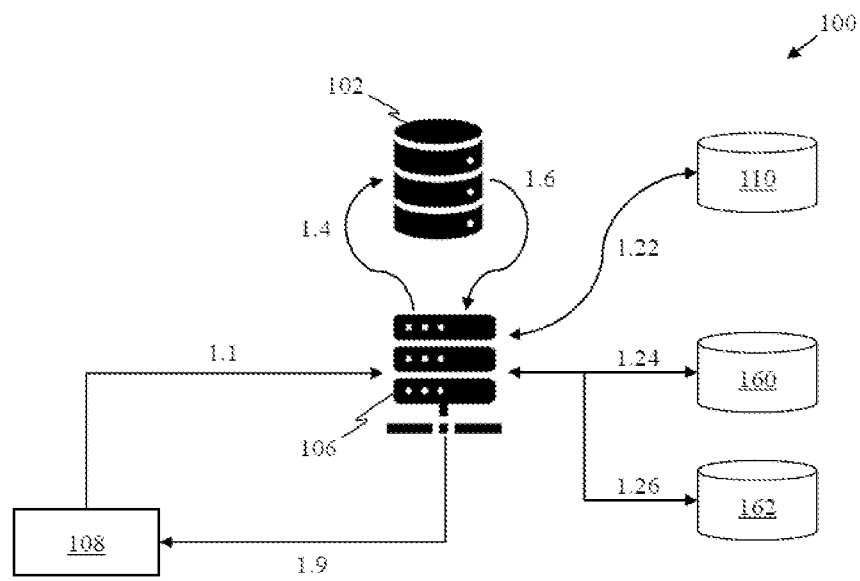
FIG. 8 illustrates how data governance compliance by asynchronous auditing is provided by the system, in accordance with an embodiment of the present invention.

Referring to FIG. 8, illustrated is how data governance compliance by asynchronous auditing is provided by the system 100, in accordance with an embodiment of the present invention. Optionally, the at least one API server 106 is further configured to: asynchronously track (at 1.24) all API operations from audit logs to generate tracking information for data governance compliance; and store (at 1.26) the tracking information in at least one of: a target audit database 160, an internal audit database 162 associated with the at least one API server 106. Optionally, a communication between the at least one API server 106 and the target database 110 occurs (at 1.22) in a synchronous manner (i.e., a synchronous mode). The tracking information is a record of all API operations between the at least one API server 106 and the target database 110. The tracking information is stored in order to properly maintain said record for audit purposes. This would help organizations to monetize their services and also detect abnormal data services usage. The asynchronous tracking optimally fetches requisite data (i.e., data from the audit logs) for generating the tracking information, without overburdening the at least one API server 106. The target audit database 160 is optionally implemented at the at least one target data source. The internal audit database 162 is optionally implemented at a memory associated with the at least one API server 106.

In FIGS. 2-8, only those components of the system 100 that are required to illustrate a corresponding technical concept are shown, for the sake of simplicity. Moreover, the metadata repository 102 is shown, for simplicity as a single storage unit, but it could also be implemented as multiple storage units.

Figure 9:
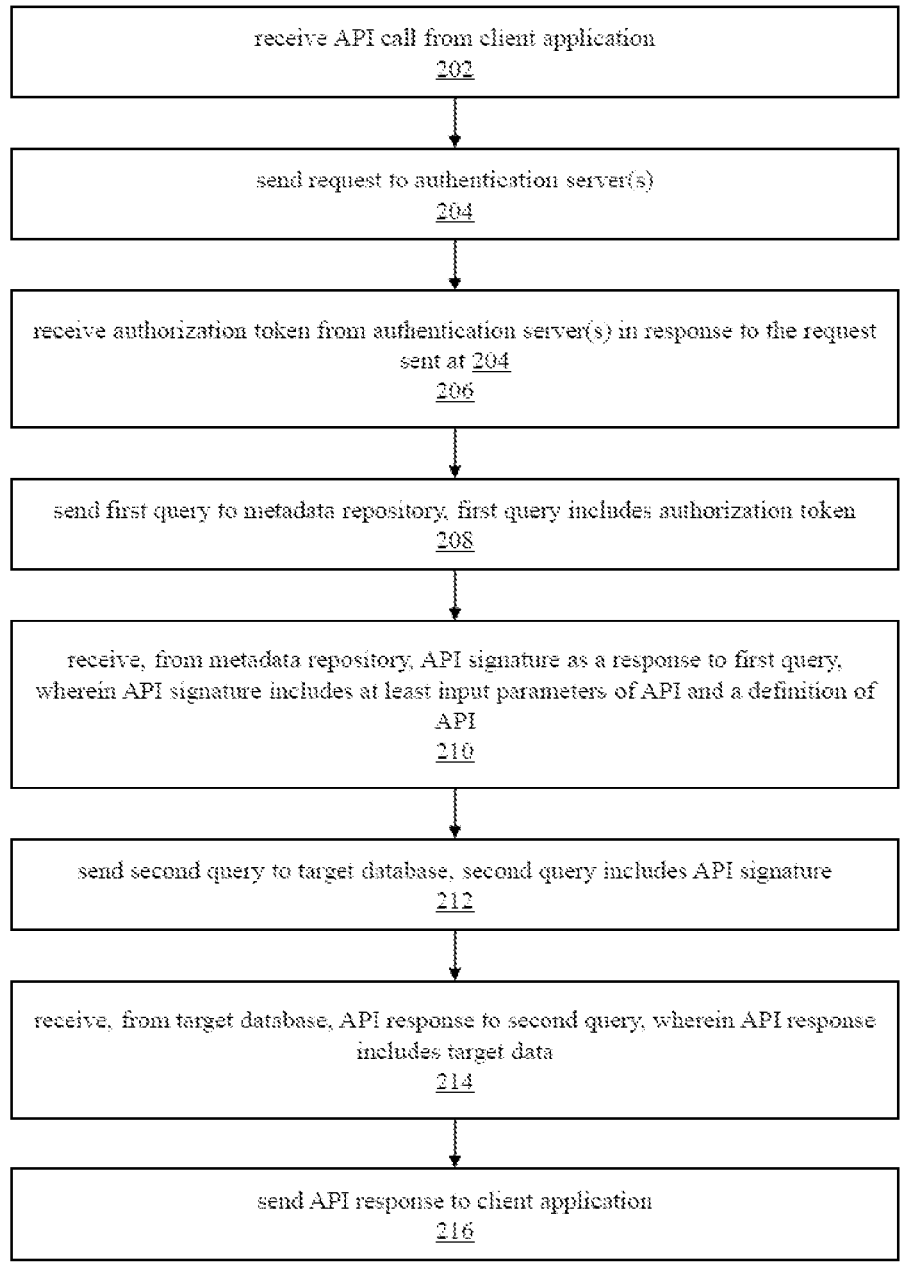
FIG. 9 illustrates a flowchart depicting steps of a method for abstraction of creation of an Application Programming Interface (API) without code, in accordance with an embodiment of the present invention.

Referring to FIG. 9, illustrated is a flowchart depicting steps of a method 200 for abstraction of creation of an Application Programming Interface (API) without code, in accordance with an embodiment of the present invention. At step 202, the API call is received from the client application 108, wherein the API call includes at least the credentials provided by the client application 108.

At step 204, the request is sent to the at least one authentication server 104, wherein the request includes the credentials.

At step 206, the authorization token is received from the at least one authentication server 104 in response to the request, when the at least one authentication server 104 determines successful authorization of the client application 108 based on the credentials.

At step 208, the first query is sent to the metadata repository 102, wherein the first query includes the authorization token in its header.

At step 210, the API signature is received from the metadata repository 102 as the response to the first query, wherein the API signature includes at least the input parameters of the API and the definition of the API, the API signature being generated by the metadata repository 102 using API metadata information stored at the metadata repository 102.

At step 212, the second query is sent to the target database 110, wherein the second query includes the API signature.

At step 214, the API response to the second query is received from the target database 110, wherein the API response includes the target data that is retrieved from the target database 110.

At step 216, the API response is sent to the client application 108. The method 200 enables efficient abstraction of the creation of the API without code. The method 200 is simple, efficient, and reliable.

The present disclosure also provides the computer program product as described above. Various embodiments and variants disclosed above, with respect to the aforementioned system 100 and method 200, apply mutatis mutandis to the computer program product. In the computer program product, examples of the non-transitory machine-readable storage medium include, but are not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or any suitable combination thereof.

The system 100, the method 200, and the computer program product disclosed above, provide an innovative and an efficient solution to mitigate complexities associated with creation of APIs. The system 100, the method 200, and the computer program product provide a solution for simplification of creation of APIs, in a manner that does not require any coding. As a result, product development lifecycles and release processes are shortened. The input parameters of the API are made flexible, without compromising on the timeline of the API development process. Moreover, the processing steps of the at least one API server 106 are not required to be repeated every time a new target data source is onboarded to the system 100. According to the system 100, the method 200, and the computer program product, virtual APIs can be created on any target data source instead of production APIs, thereby enabling frequent and comprehensive testing even when APIs are still being developed. The system 100, the method 200, and the computer program product provide a solution that supports unification, normalization and secure access of disparate target data sources that communicate differently, without requiring the client application to understand semantics, syntaxes, and complexities of each target data source. In other words, the solution of the present disclosure allows the client application to communicate with a variety of target data sources as if they were a same target data source. The solution aims to unify, fortify, restify and democratize any type of target data source and enables organizations to apply standardized policies to any target data source.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A system for abstraction of creation of an Application Programming Interface (API) without code, the system comprising:
   a metadata repository comprising a memory, where the memory configured to at least store API metadata information and generate API signatures using the API metadata information;
   at least one authentication server configured to check authorization of a client application; and
   at least one API server communicably coupled to the metadata repository and the at least one authentication server, wherein the at least one API server is configured to:
      receive an API call from the client application, wherein the API call includes at least credentials provided by the client application;
      send a request to the at least one authentication server, wherein the request includes the credentials;
      receive an authorization token from the at least one authentication server in response to the request, when the at least one authentication server determines successful authorization of the client application based on the credentials;
      send a first query to the metadata repository, wherein the first query includes the authorization token in its header;
      receive, from the metadata repository, an API signature as a response to the first query, wherein the API signature includes at least input parameters of the API and a definition of the API, the API signature being generated by the metadata repository using the API metadata information;

send a second query to a target database, wherein the second query includes the API signature;
receive, from the target database, an API response to the second query, wherein the API response includes target data that is retrieved from the target database; and
send the API response to the client application.

2. The system of claim 1, wherein the at least one API server is further configured to apply at least one transformation to the target data in the API response, prior to sending the API response to the client application, the at least one transformation being at least one of: a linear data transformation, a non-linear data transformation, an aggregation transformation.

3. The system of claim 2, wherein the at least one transformation comprises a plurality of transformations, the plurality of transformations being applied to the target data in a sequential manner and/or in a parallel manner.

4. The system of claim 1, wherein the at least one API server is further configured to enforce a multi-tier data security configuration for data governance, the multi-tier data security configuration comprising at least two of: a user profile-based security, role-based access control, payload encryption, secure transfer, metadata encryption.

5. The system of claim 1, wherein the at least one API server is further configured to execute an auto-documentation process that utilizes the API metadata information to automatically generate at least one document pertaining to the API.

6. The system of claim 1, wherein the API call pertains to a Create, Read, Update or Delete (CRUD) operation, and wherein the at least one API server is further configured to create at least one event based on the CRUD operation, the at least one event triggering at least one data process.

7. The system of claim 6, wherein the at least one data process comprises at least one data subscription process that, when executed, propagates changes in data from one target data source to another target data source.

8. The system of claim 1, wherein the at least one API server is further configured to provide the client application with access to the API metadata information stored in the metadata repository, the API metadata information being usable by a user of the client application to develop software applications on a given platform.

9. The system of claim 1, wherein the metadata repository is configured to also store dashboard metadata information, and wherein the at least one API server is further configured to:
receive a dashboard view request from the client application, wherein the dashboard view request includes a selection of one or more target data sources whose data is to be visualized on at least one dashboard;
send a third query to the metadata repository, the third query being based on the dashboard view request;
receive, from the metadata repository, a portion of the dashboard metadata information corresponding to the third query; and
execute a data visualization module to enable visualization of the data of the one or more target data sources, using the portion of the dashboard metadata information.

10. The system of claim 1, wherein the at least one API server is further configured to:
asynchronously track all API operations from audit logs to generate tracking information for data governance compliance; and
store the tracking information in at least one of: a target audit database, an internal audit database associated with the at least one API server.

11. The system of claim 1, wherein the at least one API server is further configured to provide push notifications to the client application to notify a user of the client application of ongoing activities on a platform for abstraction of creation of the API without code.

12. The system of claim 1, wherein the metadata repository comprises a metadata cache and metadata main memory that are communicably coupled and synchronized with each other, wherein the metadata cache returns the response to the first query.

13. The system of claim 1, wherein the API metadata information comprises at least two of: input parameters of APIs, definitions of APIs, columns, data security-related information, policies, profiles, rules, data filters, data sorting criteria, a structure of the API response, other API-related information, configuration information and meta-information pertaining to target databases that are communicably coupled to the at least one API server.

14. The system of claim 1, wherein when checking the authorization of the client application, the at least one authentication server is configured to:
match the credentials provided by the client application in the API call against reference credentials of authorized applications that are pre-stored in the at least one authentication server; and
generate the authorization token when the credentials match with at least one of the reference credentials, wherein such matching indicates the successful authorization of the client application based on the credentials.

15. The system of claim 1, wherein the API call also includes at least one parameter that is requested by the client application, wherein the at least one parameter is included amongst the input parameters of the API.

16. The system of claim 1, wherein the input parameters of the API are dynamically selected based on at least one of: a parameter called in the API call, a default parameter of the API.

17. The system of claim 1, wherein the input parameters of the API comprise at least two of: a range of records that is required in the target data, a list of attributes, a format of the API response, a user profile for which the target data is being retrieved, a secret used to ensure impersonation access, a definition of whether additional metadata should be sent as a part of the API response, validation rules that can be applied to the target data.

18. The system of claim 1, wherein when sending the API response to the client application, the at least one API server is configured to leverage a data streaming technique to ensure that at any given time, only a required portion of the target data is sent from the target database to the client application.

19. A method for abstraction of creation of an Application Programming Interface (API) without code, the method comprising:
receiving an API call from a client application, wherein the API call includes at least credentials provided by the client application;
sending a request to at least one authentication server, wherein the request includes the credentials;
receiving an authorization token from the at least one authentication server in response to the request, when the at least one authentication server determines successful authorization of the client application based on the credentials;

sending a first query to a metadata repository, wherein the first query includes the authorization token in its header;

receiving, from the metadata repository, an API signature as a response to the first query, wherein the API signature includes at least input parameters of the API and a definition of the API, the API signature being generated by the metadata repository using API metadata information stored at the metadata repository;

sending a second query to a target database, wherein the second query includes the API signature;

receiving, from the target database, an API response to the second query, wherein the API response includes target data that is retrieved from the target database; and sending the API response to the client application.

20. The method of claim 19, further comprising applying at least one transformation to the target data in the API response, prior to the step of sending the API response to the client application, the at least one transformation being at least one of a linear data transformation, a non-linear data transformation, an aggregation transformation.

21. The method of claim 19, further comprising enforcing a multi-tier data security configuration for data governance, the multi-tier data security configuration comprising at least two of: a user profile-based security, role-based access control, payload encryption, secure transfer, metadata encryption.

22. The method of claim 19, further comprising executing an auto-documentation process that utilizes the API metadata information for automatically generating at least one document pertaining to the API.

23. The method of claim 19, wherein the API call pertains to a Create, Read, Update or Delete (CRUD) operation, and wherein the method further comprises creating at least one event based on the CRUD operation, the at least one event triggering at least one data process.

24. The method of claim 19, further comprising providing the client application with access to the API metadata information stored in the metadata repository, the API metadata information being usable by a user of the client application to develop software applications on a given platform.

25. The method of claim 19, further comprising:
receiving a dashboard view request from the client application, wherein the dashboard view request includes a selection of one or more target data sources whose data is to be visualized on at least one dashboard;
sending a third query to the metadata repository, the third query being based on the dashboard view request;
receiving, from the metadata repository, a portion of dashboard metadata information corresponding to the third query, the dashboard metadata information being stored at the metadata repository; and
executing a data visualization module to enable visualization of the data of the one or more target data sources, using the portion of the dashboard metadata information.

26. The method of claim 19, further comprising:
asynchronously tracking all API operations from audit logs to generate tracking information for data governance compliance; and
storing the tracking information in at least one of: a target audit database, an internal audit database associated with the at least one API server.

27. The method of claim 19, further comprising providing push notifications to the client application to notify a user of the client application of ongoing activities on a platform for abstraction of creation of the API without code.

28. The method of claim 19, further comprising checking the authorization of the client application by:
matching the credentials provided by the client application in the API call against reference credentials of authorized applications that are pre-stored in the at least one authentication server; and
generating the authorization token when the credentials match with at least one of the reference credentials, wherein such matching indicates the successful authorization of the client application based on the credentials.

29. A computer program product comprising a non-transitory machine-readable data storage medium having stored thereon program instructions that, when accessed by a processing device, cause the processing device to:
receive an API call from a client application, wherein the API call includes at least credentials provided by the client application;
send a request to at least one authentication server, wherein the request includes the credentials;
receive an authorization token from the at least one authentication server in response to the request, when the at least one authentication server determines successful authorization of the client application based on the credentials;
send a first query to a metadata repository, wherein the first query includes the authorization token in its header;
receive, from the metadata repository, an API signature as a response to the first query, wherein the API signature includes at least input parameters of the API and a definition of the API, the API signature being generated by the metadata repository using API metadata information stored at the metadata repository;
send a second query to a target database, wherein the second query includes the API signature;
receive, from the target database, an API response to the second query, wherein the API response includes target data that is retrieved from the target database; and
send the API response to the client application.

* * * * *